Jan. 21, 1969     L. KLENK ET AL     3,423,493
PROCESS AND APPARATUS FOR THE MANUFACTURE
OF THERMOPLASTIC FILMS
Filed May 28, 1965

INVENTORS
LUDWIG KLENK
WALTER SEIFRIED

BY *James E. Bryan*
ATTORNEY

United States Patent Office 3,423,493
Patented Jan. 21, 1969

3,423,493
PROCESS AND APPARATUS FOR THE MANUFACTURE OF THERMOPLASTIC FILMS
Ludwig Klenk and Walter Seifried, Wiesbaden-Biebrich, Germany, assignors to Kalle Aktiengesellschaft, Wiesbaden-Biebrich, Germany, a corporation of Germany
Filed May 28, 1965, Ser. No. 459,745
Claims priority, application Germany, June 2, 1964,
K 53,106
U.S. Cl. 264—93    7 Claims
Int. Cl. B29d 7/02

ABSTRACT OF THE DISCLOSURE

This invention relates to a process and apparatus for the production of a thermoplastic film which process comprises extruding a thermoplastic melt through a slot die radially onto the surface of a rotating roll, the distance between the dye and roll surface being not in excess of about 3 mm., and drawing-off the film on the surface of the latter, the radial direction of the melt being maintained by gas pressure exerted against the melt on the side of the film facing away from the surface of the roll.

---

Figure 1:
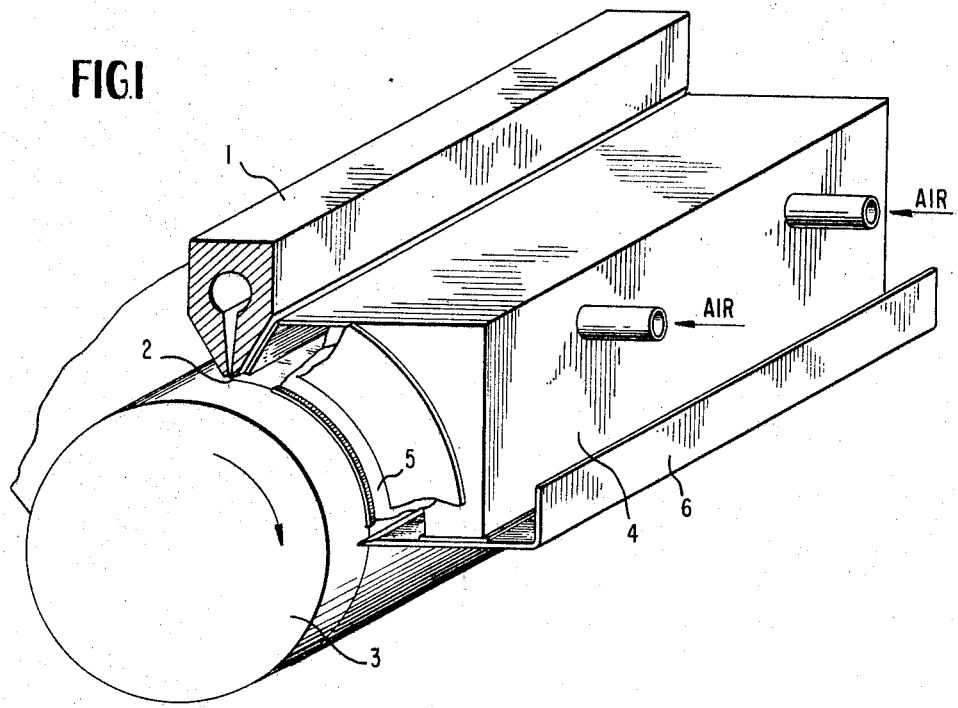

The present invention relates to a process and apparatus for the manufacture of thin, highly transparent films from thermoplastic materials by extrusion, using a cooling roll, wherein films are obtained, having only slight variations in width and thickness, at high draw-off speeds.

When using the cooling roll process of the invention, a melt is forced through a slot die having a nozzle width of 0.3 to 0.5 mm. and is drawn off by means of a rotating cooling roll. The extruded melt is longitudinally drawn to the desired film thickness, since it is practically impossible to operate with a nozzle width corresponding to the final film thickness desired. Longitudinal drawing-off is effected on the path of the melt between the die and the contact line on the roll. This distance, therefore, is also called draw-off path; the ratio of the nozzle width to the film thickness is called the draw-off ratio.

In known processes, the slot die and the cooling roll can be arranged in such a manner that the direction of the slot may form any angle to the surface of the roll, a tangential direction of the slot preferably being employed. The melt runs independently thereof, due to its viscosity and the draw-off force acting thereon, in the draw-off path in a direction tangential to the roll surface. In cases where the direction of the slot is not tangential to the roll surface, the melt is drawn over one of the two die lips, which always results in streaked, rough films with decreased surface gloss, since it cannot be avoided, after a short running time, that the edges of the lips show incrustations resulting from thermally decomposed material. When the direction of the slot is tangential, a greater distance from the dye to the roll is unavoidable for geometrical reasons. The melt is then contracted in the draw-off path by means of the draw-off force, which results in a considerable loss in width and an inaccurate travel of the film edges.

Another and decisive disadvantage of the known processes is the fact that, at higher speeds, air is included between the film and the roll surface, which prevents a firm adhesion of the film to the roll. It often occurs that a condensate of volatile materials or additives in deposited, which also impairs the contact of the film on the roll.

The contact systems proposed and utilized to improve the roll contact, such as an air-brush, or directly cooled, elastic rolls, or an electric high-tension field, can prevent the inclusion of air as well as the formation of a condensate deposit on the roll and can increase the draw-off speeds, but are useful only up to a certain speed limit depending upon the material used. Whereas low-molecular weight materials, such as those used for coating carrier material, e.g. paper, permit economical production speeds, materials of a higher molecular weight, such as are required for self-supporting films in order to achieve good mechanical properties, exhibit intermittent variations of the melt in thickness and width above a relatively low speed.

It has been found that the use of a very short draw-off path does not result in the intermittent variations in thickness and width of the film at higher draw-off speeds.

In the process of the present invention for the manufacture of thermoplastic films by extruding a melt through a slot die to a rotating, tempered roll, the melt is forced through a die arranged vertically to the surface of the tempered roll and in the draw-off path, substantially corresponding to the distance between the slot die and the surface of the tempered roll of not more than 3 mm.; it is passed vertically to the surface of the tempered roll and drawn-off only there in a tangential direction, the vertical direction of the draw-off path to the roll surface being effected by a static pressure acting on the side of the film which is facing away from the surface of the roll.

Such a conveyance of the extruded melt makes possible the reduction of the distance between the slot die and the draw-off roll and restricts the length of the draw-off path to this distance. With only very slight variations in width and thickness, the very short draw-off path permits a very high draw-off speed, which is many times the draw-off speed hitherto possible. Since the extruded film runs in the direction of the slot and not over one of the die lips, the aforementioned impairments of the film surface resulting from thermally decomposed material, which forms incrustations on the edges of the lips, are overcome and films with superior surfaces are obtained. The gas pressure acting on that side of the film which is facing away from the draw-off roll results in the desired conveyance of the draw-off melt and, simultaneously, in a better contact thereof with the draw-off roll. The extrusion as such may be effected from any direction vertically onto the draw-off roll, but a vertical alignment of the die is preferred. The process of the present invention is particularly suitable for the manufacture of flat polyolefin films, such as films of polyethylene or polypropylene.

The advantage of the process of the present invention is that, at a substantially increased draw-off speed, films can be obtained which exhibit only very slight variations in width and thickness.

The invention will be further illustrated by reference to the accompanying drawings in which one embodiment of an apparatus according to the invention is shown.

Figure 2:
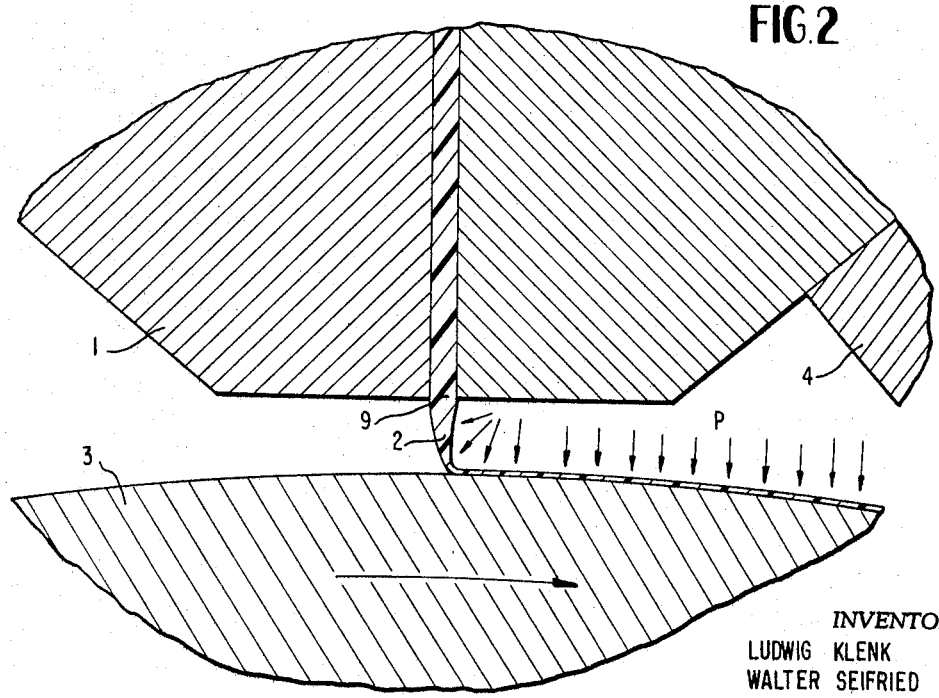

FIGURE 1 is a perspective view of the apparatus, and
FIGURE 2 illustrates the direction of the draw-off path on an enlarged scale.

Referring to the drawings, the plastic material is forced through the slot die 1 and runs, in the form of a melt film, onto the rotating cooling roll 3. The pressure chamber 4 which is supplied with air or, if required, with an inert gas, such as nitrogen or carbon dioxide, and has a length corresponding to the film width is limited on the open side thereof by the die, the extruded melt film and the roll surface. The sides of the two lateral surfaces facing the roll surface are covered with an elastic sealing material 5 conformed to the periphery of the roll so that gas losses from the pressure chamber are minimized. By means of the doctor blade 6, a small distance between the pressure chamber and the film surface may be provided so that gas losses can be kept small in this area and, in the pressure chamber, a preferably static pressure results.

The melt film 2 leaving the slot 9 of the die 1 is passed, by means of the gas pressure P in the pressure chamber 4, radially toward the surface of the cooling roll 3, prior to being abruptly bent in the direction of rotation of the roll, shortly before contacting the roll surface. The gas pressure P generally is in the range of 30–60 mm. water column.

The invention will be further illustrated by reference to the following specific examples:

EXAMPLE 1

Polypropylene having a melt index of 65 g./10 min., determined according to ASTM 1238/59T, was used as the thermoplastic material, at a contact weight of 5 kg. and at a temperature of 230° C.; 320 kg. per hour of the material were extruded at 260° C., through a slot die, the width being 1500 mm. and the slot being adjusted to 0.5 mm. The distance between the slot die and the roll surface was 1.5 mm. and the pressure in the pressure chamber was 37 mm. water column; the temperature of the roll was 20° C. At a draw-off speed of 200 m./min., a 20µ thick, highly transparent film was produced. The variations in thickness in the longitudinal and transverse directions were less than 10%.

EXAMPLE 2

Polyethylene having a density of 0.930 and a melt index of 4.7, determined according to ASTM 1238/59T, was used as the thermoplastic material. 870 kg. per hour of the material were extruded at 255° C. through a slot die, the width being 1500 mm. and the slot being adjusted to 0.5 mm. The distance between the slot die and the roll surface was 1.5 mm., as in Example 1; the pressure in the pressure chamber was 40 mm. water column and the roll temperature was 25° C. At a draw-off speed of 250 m./min., a 25µ thick, highly transparent film was produced. The variations in thickness in the longitudinal and transverse directions were less than 10%, as with polypropylene.

It will be obvious to those skilled in the art that many modifications may be made within the scope of the present invention without departing from the spirit thereof, and the invention includes all such modifications.

What is claimed is:

1. A process for the production of a thermoplastic film which comprises extruding a thermoplastic melt through a slot die downwardly radially onto the surface of a rotating roll positioned closely adjacent to the die, drawing-off the film on the surface of the roll, and maintaining the radial direction of the melt from the point where the melt leaves the die to a point adjacent the roll by producing a zone of gas pressure acting against the side of the film facing away from the surface of the roll and also acting against the side of the melt on the side thereof facing in the direction of rotation of said roll substantially throughout the width of the melt and throughout the area of the melt extending from the point where the melt leaves the die to a point adjacent the roll to produce a force on the melt opposing the melt tension produced by the rotating roll and tending to draw the melt onto the roll in a tangential direction.

2. A process as defined in claim 1 wherein a distance between the die and the roll surface is not in excess of about 3 mm.

3. A process as defined in claim 1 in which the gas pressure is exerted by air.

4. A process as defined in claim 1 in which the thermoplastic is a polyolefin.

5. Apparatus for the production of a thermoplastic film which comprises a slot die, a rotatable draw-off roll, said slot die being positioned above said draw-off roll to extrude a thermoplastic melt downwardly radially onto the surface of the roll, means defining a pressure chamber adjacent said die and said roll and disposed downstream of said die in the direction of rotation of the roll, means for introducing gas into said chamber for producing a zone of gas pressure acting against the side of the film facing away from the surface of the roll and also acting against the side of the melt on the side thereof facing in the direction of rotation of said roll substantially throughout the width of the melt and throughout the area of the melt extending from the point where the melt leaves the die to a point adjacent the roll to produce a force on the melt opposing the melt tension produced by the rotating roll and tending to draw the melt onto the roll in a tangential direction, whereby the radial direction of the melt is maintained from the point where the melt leaves the die to a point adjacent the roll.

6. Apparatus as defined in claim 5 wherein the gas introduced into said chamber is air.

7. Apparatus as defined in claim 5 wherein the thermoplastic is a polyolefin.

References Cited

UNITED STATES PATENTS

| 3,142,866 | 8/1964 | Pabo | 18—15 |
| 3,194,863 | 7/1965 | Williams et al. | 264—88 |
| 3,223,757 | 12/1965 | Owens et al. | 264—216 |
| 3,277,227 | 10/1966 | Kesseler et al. | 264—216 |

FOREIGN PATENTS 232,146  1/1961  Australia.

ROBERT F. WHITE, *Primary Examiner.*

G. AUVILLE, *Assistant Examiner.*

U.S. Cl. X.R.

1—15; 264—17, 216